US012008562B2

(12) United States Patent
Pendse et al.

(10) Patent No.: US 12,008,562 B2
(45) Date of Patent: Jun. 11, 2024

(54) EXTERNAL PAYMENT CREDENTIAL DIGITIZATION (71) Applicant: MasterCard International Incorporated, Purchase, NY (US)

(72) Inventors: Sneha Pendse, Parsippany, NJ (US); Joseph John Benson, Lake St. Louis, MO (US); Piyush Maurya, South Amboy, NJ (US); Matthew James Miller, Redding, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1027 days.

(21) Appl. No.: 15/725,630

(22) Filed: Oct. 5, 2017

(65) Prior Publication Data

US 2019/0108514 A1 Apr. 11, 2019

(51) Int. Cl.
*G06Q 20/38* (2012.01)
*G06Q 20/36* (2012.01)
(52) U.S. Cl.
CPC .......... *G06Q 20/385* (2013.01); *G06Q 20/36* (2013.01); *G06Q 20/3672* (2013.01); *G06Q 20/3674* (2013.01); *G06Q 20/3829* (2013.01); *G06Q 2220/00* (2013.01)
(58) Field of Classification Search
None
See application file for complete search history.

(56) References Cited

U.S. PATENT DOCUMENTS

| 10,275,764 | B2 * | 4/2019 | Nwokolo | G06Q 20/36 |
| 2009/0198618 | A1 * | 8/2009 | Chan | G06Q 20/02 |
| | | | | 707/E17.014 |
| 2010/0106570 | A1 * | 4/2010 | Radu | G06Q 20/20 |
| | | | | 705/14.3 |

(Continued)

FOREIGN PATENT DOCUMENTS

| AU | 755458 B2 * | 10/1999 | G07F 7/10 |
| EP | 2702723 B1 * | 3/2014 | G06F 21/10 |

OTHER PUBLICATIONS

Linn, Courtney J., "Regulating the cross-border movement of prepaid cards", Journal of Money Laundering Control 11.2: 146-171. Emerald Group Publishing Limited. (2008) (Year: 2008).*

(Continued)

*Primary Examiner* — Neha Patel
*Assistant Examiner* — Clay C Lee
(74) *Attorney, Agent, or Firm* — Buckley, Maschoff & Talwalkar LLC (57) ABSTRACT Provided are a system and method for distributing the digitization of a payment credential to an entity that does not have access to issuer master keys. In one example, the method includes receiving a personalization script for a payment credential, the personalization script generated by an issuer of the payment credential, generating tokenized payment information for the payment credential based on the received personalization script, wherein the tokenized payment information is generated by the digitization entity without having access to issuer master keys (IMKs) of the issuer of the payment credential, and transmitting the token- (Continued)

ized payment information for the payment credential to a digital wallet executing on a user device.

14 Claims, 4 Drawing Sheets

(56) References Cited

U.S. PATENT DOCUMENTS

| | | | | |
|---|---|---|---|---|
| 2013/0208893 | A1* | 8/2013 | Shablygin | H04L 9/0894 |
| | | | | 380/277 |
| 2013/0246258 | A1* | 9/2013 | Dessert | G06Q 20/36 |
| | | | | 705/41 |
| 2015/0112871 | A1* | 4/2015 | Kumnick | G06Q 20/4012 |
| | | | | 705/67 |
| 2015/0142673 | A1* | 5/2015 | Nelsen | G06Q 20/405 |
| | | | | 705/76 |
| 2015/0178724 | A1* | 6/2015 | Ngo | G06Q 20/32 |
| | | | | 705/71 |
| 2016/0057619 | A1* | 2/2016 | Lopez | G06F 9/455 |
| | | | | 380/247 |
| 2016/0103675 | A1* | 4/2016 | Aabye | G06F 8/65 |
| | | | | 717/170 |
| 2016/0350746 | A1* | 12/2016 | Johnson | H04L 9/3213 |
| 2017/0070500 | A1* | 3/2017 | Hockey | H04L 9/3228 |
| 2017/0185997 | A9* | 6/2017 | D'Alisa | G06Q 20/02 |
| 2017/0270517 | A1* | 9/2017 | Vasu | G07C 9/00309 |

OTHER PUBLICATIONS

PCT International Search Report and Written Opinion for PCT Application No. PCT/US2018/052130, dated Dec. 7, 2018, 12 pages.

* cited by examiner

EXTERNAL PAYMENT CREDENTIAL DIGITIZATION

BACKGROUND

Payment credentials (e.g., credit cards, debit cards, bank accounts, etc.) are in widespread use. Payment credentials and associated payment account numbers and/or payment tokens are frequently presented by consumers as a means of settling in-store purchase transactions, online shopping transactions, bill payments, and the like. A typical consumer may be issued a payment credential as a result of an application process. For example, an application for a payment card account may be performed online (via a website hosted by the account issuer) or at a branch office (bank branch) maintained by the issuing bank (i.e., issuer) of the payment credential.

Recently, consumers have begun associating their payment card information with different merchants (e.g., such as storing payment card information at retailers such as Amazon.com or the like). In addition, with increasing frequency, consumers are also associating their payment card information with different devices such as mobile phones, tablets, smart wearable devices, appliances, televisions, and the like. One such application that helps consumers add payment credentials to their device is a digital wallet also referred to as a mobile wallet. Mobile payments can be performed using a digital wallet. A digital wallet is typically an application on a mobile device in which a user retains information about their payment credentials. The digital wallet is activated when making a transaction and an appropriate payment vehicle is selected from the digital wallet to provide funds for the transaction. The merchant then uses this information to authorize the transaction.

Before a digital wallet can be used, payment credentials must be converted into digital form (i.e., digitized) and added to the digital wallet. Typically, a user registers details of the payment credential on the device through the digital wallet. In order for the payment credential to be added, however, the payment credential must be digitized through a series of technical and cryptographic steps that safely and securely add the payment credential to the device or add the payment credential to an application executing on the device. The digitization process is usually performed by a single entity, also referred to as a digitization entity. Examples of a digitization entity include payment processors such as MasterCard, Inc. In order for an issuer of a payment credential to have their payment credential added to a mobile device, the issuer is typically required to provide sensitive information such as master keys, etc., to the digitization entity and the digitization entity performs the digitization on behalf of the bank. While the digitization process may be widely adopted today because it is significantly easier for a payment processor to access many different clients than it is for an issuer, the digitization requires an issuer to relinquish control over their sensitive information. In addition, certain jurisdictions have "on soil" data requirements, preventing sensitive data from being shared across certain boundaries.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will understand that the embodiments may be practiced without the use of these specific details. In other instances, well-known structures and processes are not shown or described in order not to obscure the description with unnecessary detail. Thus, the present disclosure is not intended to be limited to the embodiments shown, but should be accorded the widest scope consistent with the principles and features disclosed herein.

The example embodiments are directed to a system in which a payment credential issued by an issuer is digitized for use on a mobile device by an entity that is not in control of and does not have access to issuer master keys (IMKs). Accordingly, an issuer may maintain control over sensitive information such as the IMKs and also control various details of the digitization process by generating and providing a personalization script to a digitization entity such as a payment processor. The personalization script may also be referred to as a digitization script. The digitization entity may generate tokenized payment information for the payment credential and transmit the tokenized payment information to a digital wallet executing on a mobile device. The digitization entity may perform the digitization process without having access to the IMKs.

A digitization service (performed by a digitization entity) can manage tokenization and digitization of a payment credential to generate Europay, MasterCard, and Visa (EMV) security for every transaction performed by the digitized payment credential. The digitization also provides cardholders with an opportunity to make more secure digital payments from a variety of connected devices through tap, touch, or click. During the digitization process, a payment credential's account number (e.g., primary account number) is replaced with an alternate identifier referred to generally as a token. The tokenized account information may be stored on a mobile device, for example, on a secure element of the mobile device. Once stored, the mobile device is enabled for secure payments typically though a digital wallet provided by a wallet service provider (WSP) such as Apple Pay, Samsung Pay, MasterCard MasterPass, Google Wallet, and the like. In order to perform digitization, the device must be enabled for digitization, the payment card must also be eligible, and an authentication is typically required.

In a typical tokenization process a digital wallet such as Apple Pay, requests a digitization entity such as MasterCard Digital Enablement Services (MDES) to generate a token to be added to a secure device. Typically, there is an exchange of secure information between the digitization entity and the mobile device hosting the digital wallet, and then the digitization entity performs the entire process on behalf of the issuing bank of the payment credential by using a secure set of keys, assigning token numbers, and the like, and then transfers the token to the digital wallet for provisioning on the mobile device. That is, in the conventional digitization process the digitization entity does everything. In order to perform all of these steps on behalf of the issuer, the digitization entity gets issuer master keys from the issuer, encrypts a package of tokenized payment information to be written onto the secure element of the mobile device, and transmits the encrypted package of tokenized payment information to the secure element of the mobile device.

This process can often be beneficial for an issuing bank which can be localized to a particular state, country, or region, whereas the digitization entity is often a global entity such as MasterCard, Visa, etc. However, this process involves the issuer releasing secure information to the digitization entity. Furthermore, a number of countries and markets have on-soil requirements that prevent sensitive and secure payment information from leaving a sovereign boundary. For example, for regulatory purposes, countries such as China require an issuer to maintain control over their issuer master keys because they are considered sensitive payment information.

According to various embodiments, the digitization of a payment credential is broken up and distributed across multiple entities including an issuer and a digitization entity. In some examples, a cryptographic service provider (CSP) may be included in the digitization process and/or be an agent for issuer. Issuer master keys (IMKs) are controlled by the issuer and may be shared with the CSP. However, the IMKs are not shared with the digitization entity. Instead, the issuer (or the CSP) generates a personalization script for extracting and adding payment information of a payment credential issued by the issuer and provides the personalization script to the digitization entity. The digitization entity still performs the device personalization of the payment credential, however, the issuing bank retains more control over the card level keys such as IMKs. Another benefit is that the issuer can customize various features of the digitized payment credential (e.g., turn functionalities on/off on the card, require or not require a PIN during transactions, etc. It also gives the Issuer more control over their master keys which is a sensitive element of the payment processing. For regulatory purposes, the distributed digitization process meets on-soil data requirements such as Chinese regulation which requires sensitive payment information and other information to be held by a bank on the ground in China without leaving sovereign boundaries. Furthermore, the digitization process still performs an exchange process between a digital wallet and a digitization entity without requiring the digital wallet to connect to an individual bank.

As described herein, a personalization script includes instructions for extracting payment information of a payment credential from a payment vehicle such as a payment card, a fob, and the like, and adding the extracted payment information to a mobile device. The personalization script may be generated by an issuer of the payment credential (or a CSP associated with the issuer) and may include a PAN, track data, and data that is typically stored within a credit card chip or magnetic stripe. The digitization entity extracts payment information from a chip or stripe and puts it into the mobile device based on the personalization script. In doing so, the system enables the Issuer to have tighter control over their sensitive data.

The CSP may be a key manager that acts as an agent of the issuer. The CSP may control keys in order to complete the digitization process securely. Issuer master keys (IMKs) are unique to an issuing bank and are typically used to derive other keys used during a transaction. For example, an IMK may be used to generate unique keys for a specific card (known as a Card Master Key or CMK), and the CMKs are used to derive keys unique to a payment transaction through a derivation process. The derivation may be performed by a DES algorithm (e.g. triple DES). Examples of IMK usage include generation of an application cryptogram, secure messaging integrity, secure messaging confidentiality, ICC dynamic number, and the like. The derived card master keys may be associated with a digital wallet during a personalization phase of the digitization process.

Figure 1:
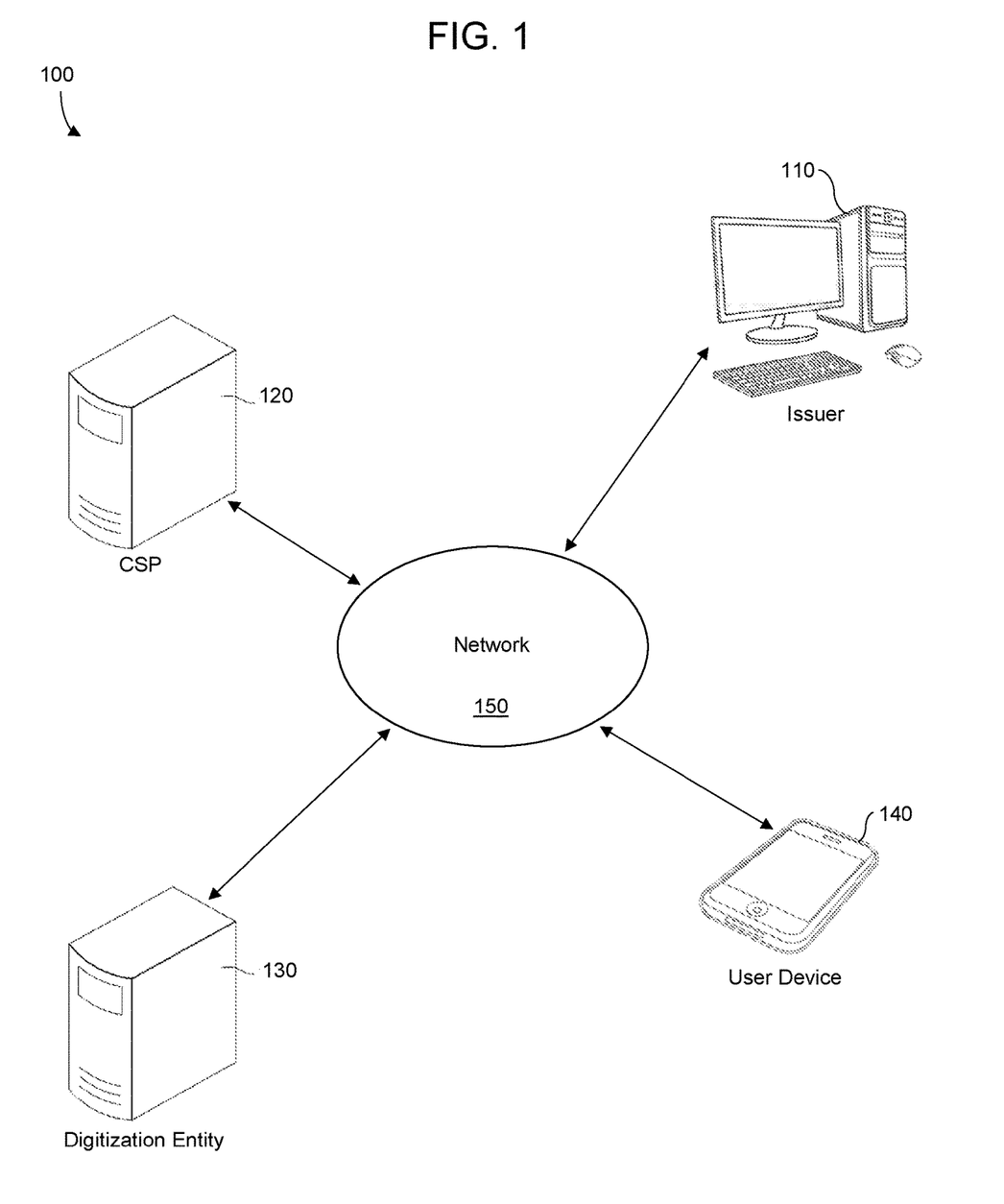
FIG. 1 is a diagram illustrating a system for externalizing a payment credential digitization in accordance with an example embodiment.
Figure 2:
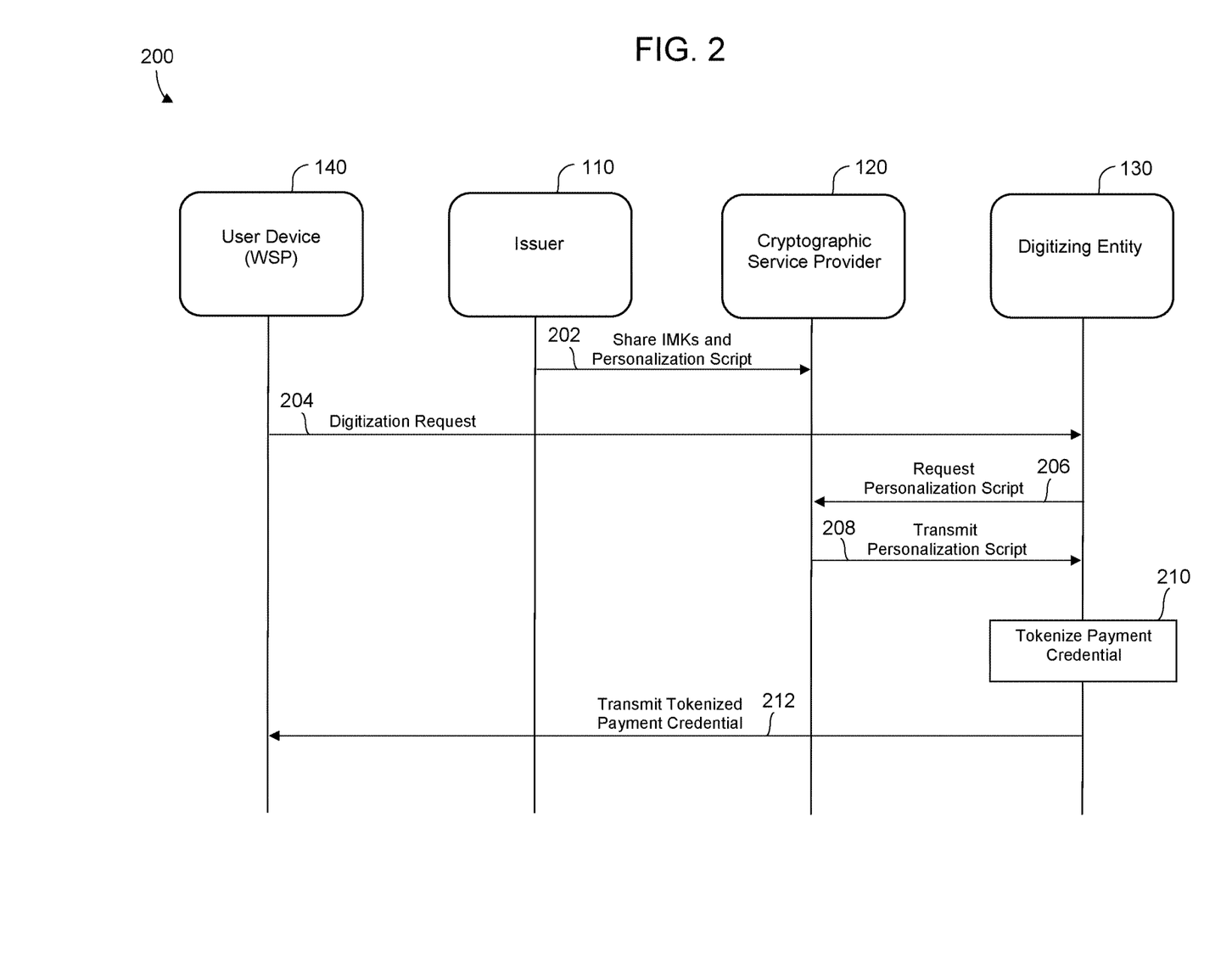
FIG. 2 is a sequence diagram illustrating a process for externalizing a payment credential digitization in accordance with an example embodiment.

FIG. 1 illustrates a system 100 for externalizing a payment credential digitization in accordance with an example embodiment, and FIG. 2 illustrates a sequence for externalizing a payment credential digitization in accordance with an example embodiment. Referring to FIGS. 1 and 2, the system includes an issuing bank system ("issuer") 110, a cryptographic service provider (CSP) 120, a digitization entity 130, and a user device 140 that may include a digital wallet hosted by a wallet service provider (WSP) installed therein. In these examples, the devices included in system 100 are connected to each other via a network 150 (shown in FIG. 1) which may include a public network such as the Internet, a private network, or a combination thereof.

The issuer 110 may issue a payment credential (e.g., a payment card, a debit card, a credit card, a bank account, a transaction card, etc.) that is owned by a cardholder associated with the user device 140. The CSP 120 may be an agent of the issuer 110 and may manage keys such as issuer master keys (IMKs) that are unique to the issuer 110. The IMKs may be used to derive keys for a purchase transaction made by the cardholder of user device 110 using the payment credential issued by issuer 110. In some embodiments, the CSP 120 may be omitted from the system 100, but for purposes of explanation, the CSP 120 acts as an agent on behalf of the issuer 110 in the examples of FIGS. 1 and 2.

The digitization entity 130 may be an encryption provider and may perform encryption of electronic data such as payment credentials. The digitization entity 130 may receive payment information such as a PAN and generate one or more tokens representing the payment information in tokenized form. For example, the digitization entity may perform encryption based on a data encryption standard (DES), although embodiments are not limited thereto. The user device 140 may be a mobile device such as a smart phone, a tablet, a smart wearable device, a kiosk, a laptop, a computer, and the like. The user device 140 may include a secure storage element configured to store tokenized payment information provided from the digitization entity 130.

As shown in FIG. 2, in 202, the issuer 110 shares sensitive data unique to the issuer 110 with the CSP 120. For example, the issuer 110 may share issuer master keys, personalization script specifications, payment credentials, and the like, with the CSP 120. The issuer 110 may share the information prior to the sequence diagram shown in FIG. 2, but for example purposes the sharing is shown in 202. In this example, the user device includes a digital wallet (also referred to as a mobile wallet) that is capable of storing digitized payment credentials and that is hosted by a wallet service provider (WSP). Examples of a digital wallet include MasterPass from MasterCard, Apple Pay, Samsung Pay, Google Wallet, and the like.

A user may interact with the digital wallet executing on the user device 140 and request that a payment credential issued by issue 110 be added to the digital wallet on the user device 140. In 204, the digital wallet via the user device 140 may transmit a digitization request to the digitizing entity 130. The request may include an identification of the payment credential (e.g., card number, token, expiry, name, etc.) In addition to the request, the digital wallet of the user device 140 may transmit authentication information of the user of the user device 140 that verifies the cardholder's identity. For example, the digital wallet may scan biometric information (e.g., retinal, fingerprint, facial data, etc.) of the user for authentication and transmit cardholder information of the authenticated user such as email address, billing information, geographical information, and the like, to the digitizing entity 130.

In 206, in response to receiving the request (and in some cases authenticating the user) the digitization entity 130 requests a personalization script from the issuer 110 and/or the CSP 120. In 208, the issuer 110 or the CSP 120 provides the requested personalization script to the digitizing entity 130. The personalization script may include a unique specification for extracting payment information from a payment vehicle such as a credit card, debit card, fob, etc., and generating a tokenized payment credential. However, according to various embodiments, the issuer 110 and/or the CSP 120 do not provide issuer master keys to the digitizing entity 130. In other words, the control of the issuer master keys is retained by the issuer 110 and they are not exposed to the digitizing entity 130. Accordingly, sensitive financial information of the issuer 110 is not divulged to a third party.

According to various embodiments, the system 100 externalizes the payment credential digitization process from an entity (in this case the issuer and CSP) that controls the issuer master keys. However, the user is still able to access the digitization entity 130 for performing digitization of the user's payment credential. One of the benefits to this is that the digitizing entity 130 is often a global processor of transactions such as MasterCard and has easier and more avenues with which to access to cardholders whereas the issuing bank may be a local bank on the ground in a particular jurisdiction that is limited in its abilities to reach cardholders. Furthermore, control of sensitive financial information is maintained by the issuer 110 (and its agent the CSP 120) thus satisfying on-soil data requirements in jurisdictions where data privacy prevents payment data from leaving sovereign boundaries. At present, there are over 60 countries where such on-soil data requirements exist.

In 210, the digitizing entity 130 generates tokenized payment information for the payment credential. For example, the tokenized payment information may include a primary account number, an expiry, a name, address, etc. associated with the payment credential. The tokenized payment information is transmitted to the user device 140, in 212. For example, the tokenized payment credential may be transmitted from the digitization entity 130 to a secure storage element of the user device 140 where it can be stored and enabled for use with the digital wallet included on the user device 140.

Figure 3:
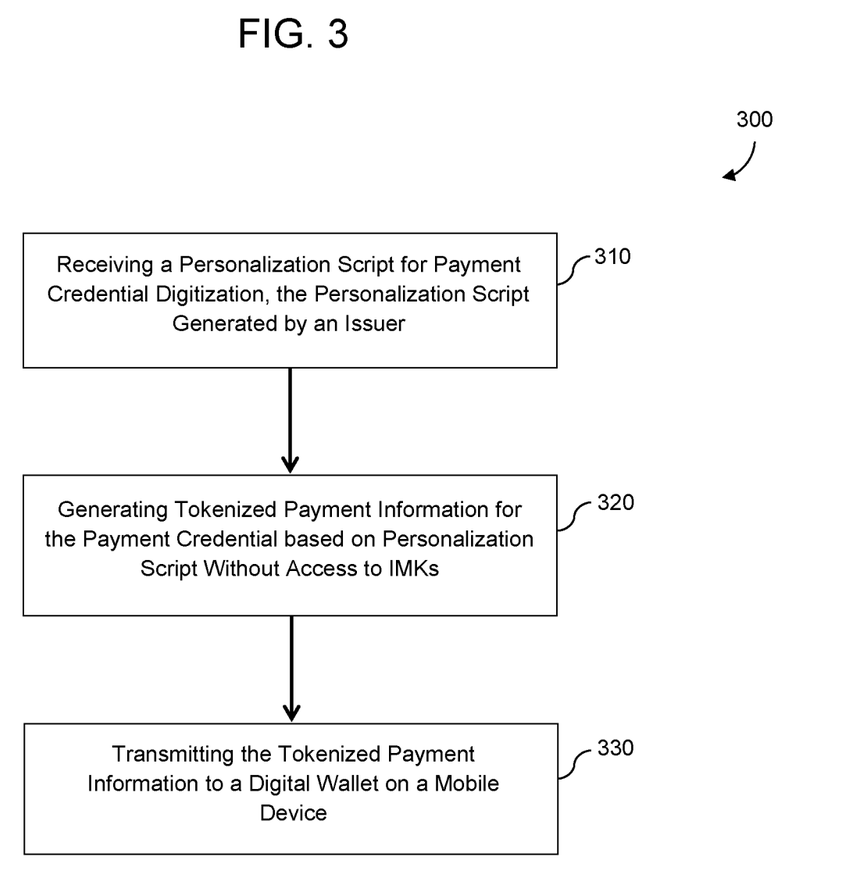
FIG. 3 is a diagram illustrating a payment credential digitization method in accordance with an example embodiment.

FIG. 3 illustrates a payment credential digitization method 300 in accordance with an example embodiment. For example, the method 300 may be performed by the digitization entity shown in FIG. 1, for example, a payment processor, a digital encryption service, a secure payment network, and the like. Referring to FIG. 3, in 310, the method includes receiving a personalization script for a payment credential. According to various embodiments, the personalization script may be generated by an issuer of the payment credential or an agent of the issuer of the payment credential. The personalization script may include instructions for extracting payment account information from a card (e.g., a card chip, a magnetic stripe, etc.), tokenizing the payment account information, and adding the tokenized payment information to a mobile device. In some examples, the digitization entity may receive a request, from a digital wallet, for digitizing the payment credential prior to receiving the personalization script, and the digitization entity may request the personalization script from the issuer or the agent thereof.

In 320, the method further includes generating tokenized payment information for the payment credential based on the received personalization script. According to various embodiments, the tokenized payment information is generated by the digitization entity even though the digitization entity does not have access to issuer master keys of the issuer of the payment credential. In this case, the issuer master keys may be retained by the issuer or an agent thereof without divulging the sensitive information to external sources such as the digitization entity. This process satisfies on-soil data requirements by preventing sensitive data from leaving sovereign boundaries but still allows a digital wallet to access a global payment processor to conveniently perform the payment card digitization process rather than having to attempt to contact the individual issuing bank. In 330, the method includes transmitting the tokenized payment information for the payment credential to a digital wallet executing on a user device. Here, the tokenized payment information may include a token which can be encrypted and which is to be added to a secure element of the mobile device.

In some embodiments, the tokenization in 320 may only be performed in response to a successful authentication of a cardholder or account holder of the payment credential. For example, the method may include performing authentication with the cardholder of the payment credential via the mobile device prior to generating the tokenized payment information for the payment credential. The authentication may include a biometric authentication (e.g., fingerprint, retinal scan, facial scan, etc.). As another example, the authentication may include a password, username, PIN, and the like.

In some embodiments, the issuer master keys may be held by the issuer of the payment credential, and the issue master keys are not known by the digitization entity during the generation of the tokenized payment information. In this example, the method may further include transmitting a request for the personalization script to the issuer, and receiving the personalization script from the issuer in response to the request. In some embodiments, the issuer master keys may be held by the CSP in addition to or instead of the issuer. In this example, the method may further include transmitting a request for the personalization script to the CSP, and receiving the personalization script from the CSP in response to the request.

Figure 4:
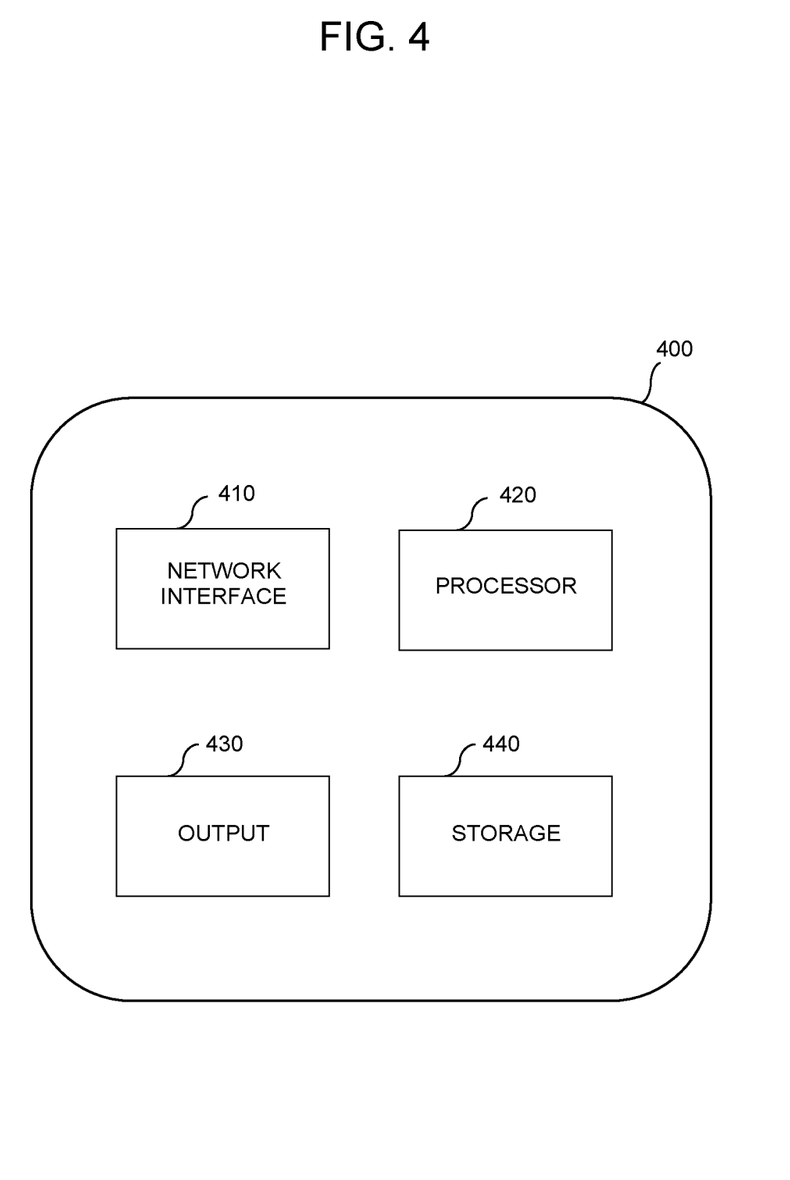
FIG. 4 is a diagram illustrating a computing system for payment credential digitization in accordance with an example embodiment.

FIG. 4 is a diagram illustrating a computing system 400 for payment credential digitization in accordance with an example embodiment. The computing system 400 may be the digitization entity shown in FIG. 1, or another digitization device. Referring to FIG. 4, the computing system 400 includes a network interface 410, a processor 420, an output 430, and a storage device 440. Although not shown in FIG. 4, the computing system 400 may include other components such as a display, an input unit, a receiver/transmitter, and the like. The network interface 410 may transmit and receive data over a network such as the Internet, a private network, a public network, and the like. The network interface 410 may be a wireless interface, a wired interface, or a combination thereof. The processor 420 may include one or more processing devices each including one or more processing cores. In some examples, the processor 420 is a multicore processor or a plurality of multicore processors. Also, the processor 420 may be fixed or it may be reconfigurable. The processor 420 may control the other components of the computing system 400. The output 430 may output data to an embedded display of the computing system 400, an externally connected display, a cloud, another device, and the like. The storage device 340 is not limited to any particular storage device and may include any known memory device such as RAM, ROM, hard disk, and the like.

According to various embodiments, the network interface 410 may receive a personalization script for a payment credential. For example, the personalization script may be generated by an issuer of the payment credential, or an agent of the issuer such as a cryptographic service provider. The personalization script may include instructions for extracting payment information from a payment vehicle storing the payment credential, tokenizing the payment information, and adding the tokenized payment information to a user device. In some embodiments, the network interface 410 is further configured to receive a request, from a digital wallet on the user device, for digitizing the payment credential prior to receiving the personalization script.

The processor 420 may generate tokenized payment information for the payment credential based on the received personalization script. According to various embodiments, the processor 420 is configured to generate the tokenized payment information without the computing system 400 having access to issuer master keys (IMKs) of the issuer of the payment credential. In addition, the processor 420 may control the network interface 410 to transmit the tokenized payment information for the payment credential to a digital wallet executing on the user device. In some examples, the processor 420 may authenticate a cardholder of the payment credential via the user device prior to generating the tokenized payment information for the payment credential.

In some embodiments, the network interface 410 may transmit a request for the personalization script to the issuer, and receive the personalization script from the issuer in response to the request. In this example, the IMKs may be held by the issuer of the payment credential, and the IMKs may not be known by the computing system 400 during the generation of the tokenized payment information. In some embodiments, the network interface 410 may transmit a request for the personalization script to a CSP associated with the issuer, and receive the personalization script from the CSP in response to the request. In this example, the IMKs may be held by the CSP associated with the issuer in addition to or instead of the issuer, and the IMKs may not be known by the digitization device during the generation of the tokenized payment information.

As used herein and in the appended claims, the term "payment card account" includes a credit card account, a deposit account that the account holder may access using a debit card, a prepaid card account, or any other type of account from which payment transactions may be consummated. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling transactions such as pushing funds to a payment card which is unique to the exemplary embodiments as well as purchase transactions such as receiving funds from a payment card. An example of such a system is the one operated by MasterCard International Incorporated, the assignee of the present disclosure. In some embodiments, the term "payment card system" may be limited to systems in which member financial institutions issue.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like, and also refer to any suitable payment account such as a deposit account, bank account, credit account, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Furthermore, although the example embodiments have been described in connection with specific figures and descriptions, it should be understood that various changes, substitutions, and alterations apparent to those skilled in the art can be made to the disclosed embodiments without departing from the spirit and scope of the present disclosure as set forth in the appended claims.

What is claimed is:

1. A method, comprising:
   receiving, via a digitization entity located in a first geographic jurisdiction, a request for tokenizing payment card data of a payment card associated with a payment account stored in a second geographic jurisdiction that comprises regulations which restrict sharing of payment account data stored in the second geographic jurisdiction from being shared outside of the second geographic jurisdiction;
   retrieving a personalization script for the payment card from an issuer of the payment account located in the second geographic jurisdiction, wherein the personalization script comprises instructions for digitizing payment account data from the payment account hosted in the second geographic jurisdiction onto a mobile device located in the first geographic jurisdiction and which satisfies the regulations which restrict sharing of payment account data stored in the second geographic jurisdiction from being shared outside of the second geographic jurisdiction, the personalization script generated based on issuer master keys provided by an issuer of the payment account;
   executing the personalization script at the digitization entity;
   extracting the payment account data from the payment card based on issuer instructions for extracting the payment account data included in the personalization script when executing the personalization script at the digitization entity;
   converting the extracted payment account data into tokenized payment account data based on issuer instructions for tokenizing the payment card included in the personalization script when executing the personalization script at the digitization entity; and
   transmitting the tokenized payment account data to a secure element of the mobile device when executing the personalization script at the digitization entity.

2. The method of claim 1, wherein the payment account data comprises a primary account number (PAN) from the payment card and the digitizing comprises adding a tokenized PAN to the user device based on the issuer instructions included in the personalization script.

3. The method of claim 1, further comprising receiving a request, from the digital wallet, for digitizing the payment card data prior to retrieving the personalization script from the issuer located in the second jurisdiction.

4. The method of claim 1, further comprising transmitting a request for the personalization script to a cryptographic service provider, and receiving the personalization script from the cryptographic service provider in response to the request.

5. The method of claim 1, further comprising authenticating a cardholder of the payment card via the user device prior to extracting the payment account data from the payment card.

6. The method of claim 1, wherein the method further comprises extracting an account number from a chip or a strip of the payment card based on the issuer instructions included in the personalization script, and the converting comprises generating a tokenized account number based on the issuer instructions included in the personalization script.

7. A digitization device, comprising:
   a network interface configured to receive, via a digitization entity located in a first geographic jurisdiction, a request for tokenizing payment card data of a payment card associated with a payment account stored in a second geographic jurisdiction that comprises regulations which restrict sharing of payment account data stored in the second geographic jurisdiction from being shared outside of the second geographic jurisdiction; and
   a processor configured to
      retrieve a personalization script for the payment card from an issuer of the payment account located in the second geographic jurisdiction, wherein the personalization script comprises instructions for digitizing payment account data from the payment account hosted in the second geographic jurisdiction onto a mobile device located in the first geographic jurisdiction and which satisfies the regulations which restrict sharing of payment account data stored in the second geographic jurisdiction from being shared outside of the second geographic jurisdiction the personalization script generated based on issuer master keys provided by an issuer of the payment account,
      execute the personalization script at the digitization device,
      extract payment account data from the payment card based on issuer instructions for extracting the account information included in the personalization script when executing the personalization script,
      convert the extracted payment account data into tokenized payment account data based on issuer instructions for tokenizing the payment account data included in the personalization script when executing the personalization script at the digitization entity, and
      transmit the tokenized payment account data to a secure element of the mobile device when executing the personalization script at the digitization entity.

8. The digitization device of claim 7, wherein the payment account data comprises a primary account number (PAN) from the payment card and the processor is configured to add a tokenized PAN to the user device based on the issuer instructions included in the personalization script.

9. The digitization device of claim 7, wherein the network interface is further configured to receive a request, from the digital wallet, for digitizing the payment card prior to retrieving the personalization script from the issuer located in the second jurisdiction.

10. The digitization device of claim 7, wherein the network interface is further configured to transmit a request for the personalization script to a cryptographic service provider, and receive the personalization script from the cryptographic service provider in response to the request.

11. The digitization device of claim 7, wherein the processor is further configured to authenticate a cardholder of the payment card via the user device prior to extracting the payment account data from the payment card.

12. A non-transitory computer readable medium having stored therein instructions that when executed cause a computer to perform a method comprising:
- receiving, via a digitization entity located in a first geographic jurisdiction, a request for tokenizing payment card data of a payment card associated with a payment account hosted in a second geographic jurisdiction that comprises regulations which restrict sharing of payment account data stored in the second geographic jurisdiction from being shared outside of the second geographic jurisdiction;
- retrieving a personalization script for the payment card from an issuer of the payment account located in the second geographic jurisdiction, wherein the personalization script comprises instructions for digitizing payment account data from the payment account stored and hosted in the second geographic jurisdiction onto a mobile device, the personalization script generated based on issuer master keys provided by an issuer of the payment account;
- executing the personalization script at the digitization entity;
- extracting the account information from the payment card data based on issuer instructions for extracting the payment account data included in the personalization script when executing the personalization script at the digitization entity;
- converting the extracted payment account data into tokenized account information based on issuer instructions for tokenizing the payment account data included in the personalization script when executing the personalization script at the digitization entity; and
- transmitting the tokenized payment account data to a secure element of the mobile device when executing the personalization script at the digitization entity.

13. The non-transitory computer readable medium of claim 12, wherein the payment account data comprises a primary account number (PAN) from the payment card and the digitizing comprises adding a tokenized PAN to the user device based on the issuer instructions included in the personalization script.

14. The non-transitory computer readable medium of claim 12, wherein the method further comprises transmitting a request for the personalization script to a cryptographic service provider, and receiving the personalization script from the cryptographic service provider in response to the request.

* * * * *